United States Patent [19]

Somers et al.

[11] Patent Number: 5,026,964
[45] Date of Patent: Jun. 25, 1991

[54] OPTICAL BREAKTHROUGH SENSOR FOR LASER DRILL

[75] Inventors: Ralph M. Somers, West Chester; Diana R. Compton, Cincinnati, both of Ohio

[73] Assignee: General Electric Company, Cincinnati, Ohio

[21] Appl. No.: 835,070

[22] Filed: Feb. 28, 1986

[51] Int. Cl.$^5$ .................. B23K 26/04; B23K 26/02
[52] U.S. Cl. .................. 219/121.7; 219/121.83; 219/121.71; 219/121.62
[58] Field of Search .................. 219/121 LA, 121 LB, 219/121 LK, 121 LL, 121 LZ, 121 L, 121 LM, 121 LG, 121.13, 121.18, 121.03, 121.32, 121.54, 121.55, 121.57, 121.6, 121.61, 121.62, 121.67, 121.7, 121.71, 121.78, 121.81, 121.83, 121.85; 250/205; 356/152; 901/42; 228/8, 9

[56] References Cited

U.S. PATENT DOCUMENTS

| 4,087,672 | 5/1978 | Yi .............................. 219/121 LB X |
| 4,417,179 | 11/1983 | Fujimura et al. ................. 250/205 X |
| 4,476,512 | 10/1984 | Sunago et al. ................. 219/121 LB |
| 4,564,012 | 1/1986 | Shimada et al. .......... 219/121 LB X |
| 4,576,480 | 3/1986 | Travis .................................. 356/152 |
| 4,608,480 | 8/1986 | Bizot et al. .............. 219/121 LB X |
| 4,627,725 | 12/1986 | Nishio et al. ......................... 356/152 |
| 4,633,058 | 12/1986 | Jones ............................ 219/121 LK |
| 4,663,513 | 5/1987 | Webber ............................ 219/121 L |

FOREIGN PATENT DOCUMENTS 0205689 11/1983 Japan .............................. 219/121 LZ

OTHER PUBLICATIONS

Kobayashi et al., "Laser Drilling of Non-Metals," Finnominechanika-Mikrotechnika, vol. 12, No. 7, Jul. '73, pp. 193-200.

Primary Examiner—Linda J. Wallace
Attorney, Agent, or Firm—Jerome C. Squillaro; Nathan D. Herkamp

[57] ABSTRACT

An apparatus and method for detecting when a hole has been drilled through a workpiece by way of a pulse laser drilling process having a machine control for controlling whether the pulse laser drill emits laser pulses. The apparatus detects the laser pulse and produces an output signal representative thereof. The output signal is clipped and compared to a first reference signal for producing a compared output signal when the clipped output signal is greater than the first reference signal. The compared output signal triggers an enabling output signal representative of a pulse having a predetermined interval. The apparatus also detects reflected radiation from an entrance of the hole being drilled to produce an output signal which is then clipped and compared to a second reference signal to produce a disabling output signal when the output signal representative of the reflected radiation is greater than the second reference signal. When the disabling signal terminates before the enabling signal a gating pulse indicative of when a hole is drilled is generated for stopping any further laser pulse.

17 Claims, 2 Drawing Sheets

DRILLING OR
REMOVING METAL
THROUGH HOLE
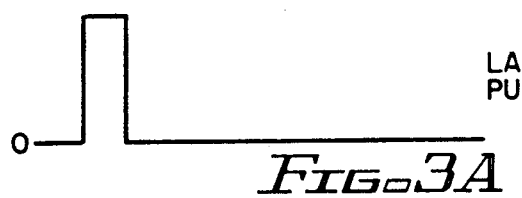
LASER PULSE
FIG. 3A
FIG. 4A
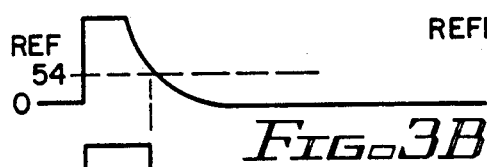
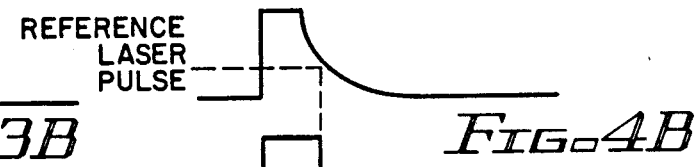
REFERENCE LASER PULSE
FIG. 3B
FIG. 4B
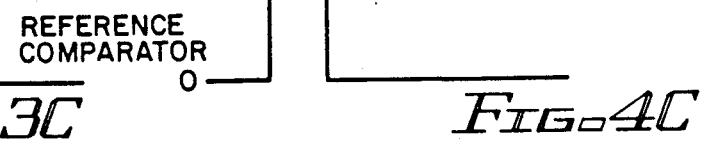
REFERENCE COMPARATOR
FIG. 3C
FIG. 4C
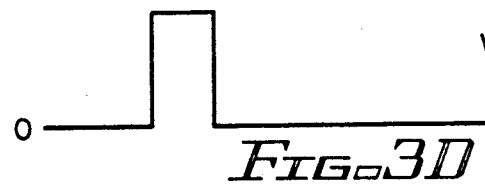
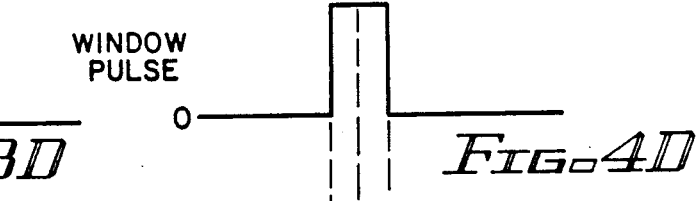
WINDOW PULSE
FIG. 3D
FIG. 4D
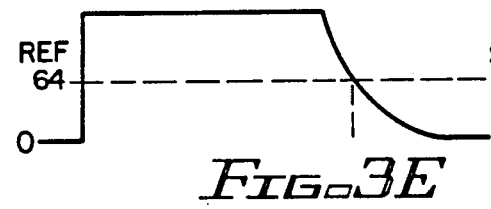
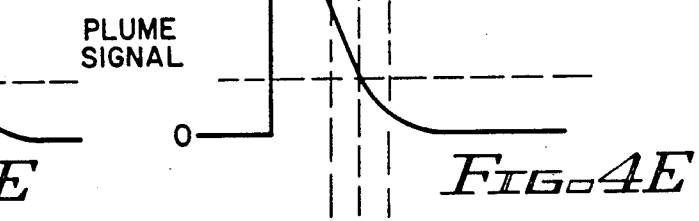
PLUME SIGNAL
FIG. 3E
FIG. 4E
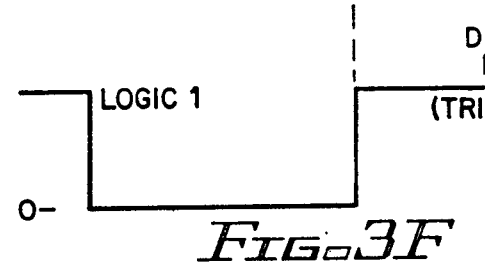
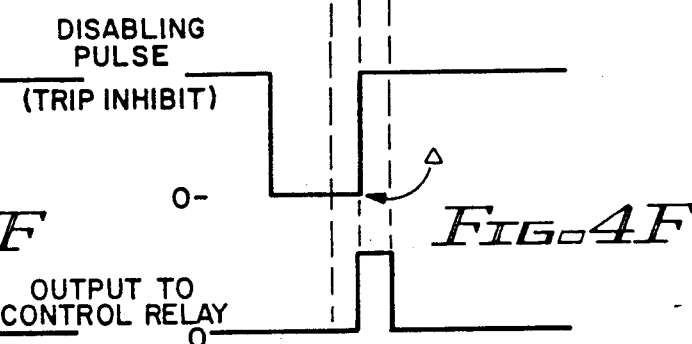
DISABLING PULSE (TRIP INHIBIT)
FIG. 3F
FIG. 4F
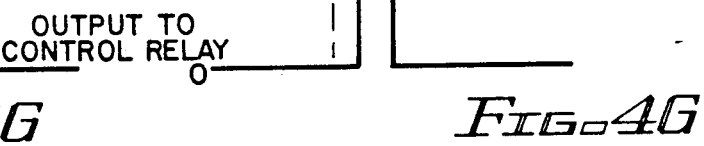
OUTPUT TO CONTROL RELAY
FIG. 3G
FIG. 4G

OPTICAL BREAKTHROUGH SENSOR FOR LASER DRILL

FIELD OF THE INVENTION

This invention relates to the control of a pulse laser drilling process and, more particularly, to a system and method for detecting when a pulse laser drill has drilled through a workpiece.

BACKGROUND OF THE INVENTION

Many workpieces currently being manufactured require the drilling of extremely small diameter holes through the workpieces. Such holes are sometimes referred to as "through holes." An example of such is a turbine blade for a jet engine which requires the drilling of numerous cooling holes in various portions of the blades. Because of the small diameter of such holes, they are commonly drilled using a laser drilling process, which process is controlled by regulating the amount of energy per pulse and the number of pulses per hole. Typically, a machine control is programmed to effect the delivery of a predetermined number of shots or laser pulses for each specific hole. Due to variations inherent in the manufacture of the undrilled parts, the thickness of metal walls in such parts is not always constant. When a wall is too thick, an incomplete hole may be drilled (underdrilling) and redrilling of the part is required. If the wall is thinner than expected, the programmed number of laser pulses will penetrate the wall and may scar any material in the laser beam path (overdrilling). This overdrill condition results in added expense for material evaluation, reinspection, and sometimes parts scrapping.

It is preferable in laser beam drilling of workpieces with limited and sometimes inaccessible internal spaces, such as jet engine turbine blades, to determine if a hole is completely through by looking at the workpiece from the front or beam side with a radiation sensing system. However, in the operation of a pulse laser drill, the laser pulse beam striking the material to be drilled, results in the production of very high temperatures by intense local heating in as much as laser drilling is a thermal process. The intense local heating causes very hot minute particles of material to be expelled from the localized drilling area. The heated minute particles, in the form of a plume of sparks, radiate heat and light, i.e. extrinsic radiation. When a radiation sensing system looking for intrinsic laser pulse radiation is used to determine if a hole is completely through, the extrinsic radiation from the hot minute particles causes false readings in the radiation sensing system.

It is an object of the present invention to provide a method and apparatus for detecting when a through bore is drilled in a workpiece.

It is a further object of the present invention to provide a method and apparatus for discriminating between intrinsic radiation and extrinsic radiation in a pulse laser drilling operation.

It is still another object of the present invention to provide an apparatus and method which prevents further drilling once a through bore is drilled in the workpiece.

It is yet another object of the present invention to provide an apparatus and method which prevents underdrilling in a pulse laser drilling operation.

SUMMARY OF THE INVENTION

The present invention teaches an apparatus and method for detecting when a through hole is drilled in a workpiece using a pulse laser process. A machine control directs a laser which provides a plurality of laser pulses to a location on the workpiece where a hole is desired. The laser incident on the workpiece creates a plume of radiation caused by reflected laser radiation and radiation from heated particles. An apparatus for detecting when the laser beam bores through the workpiece comprises a reference radiation sensing detector circuit which senses the drilling laser pulses for producing a synchronization signal, a plume radiation sensing detector circuit which senses intrinsic laser pulse radiation reflected from the workpiece and extrinsic radiation radiated by heated minute particles in the drilling plume for producing an output signal representative thereof, and evaluating means for receiving said synchronization signal and said output signal for discriminating between the intrinsic reflected laser radiation and the extrinsic radiation from the heated particles.

In accordance with a preferred embodiment of the present invention, the radiation sensing detector comprises a photodetector sensing means. The reference photodetector circuit comprises an amplifier connected to the reference photodetector for conditioning the output pulse from the reference photodetector. A non-inverting comparator compares the output from the amplifier to a voltage reference for producing a reference square pulse. The trailing edge of the reference square pulse from the non-inverting comparator triggers a monostable multivibrator which produces a synchronization signal in the form of a window pulse. One input into the evaluation means is the window pulse from the monostable multivibrator.

The plume photodetector circuit comprises an amplifier which receives the output from the plume photodetector. Since the plume photodetector receives the radiation from the laser pulse and the radiation from the heated minute particles, the amplifier is designed to be driven into saturation by the output from the plume photodetector to remove any variation of intensity of width in the laser pulse. An inverting comparator compares an output from the amplifier to a reference voltage for producing a disabling pulse. A second input of the comparing means is the square pulse. In addition to the inputs from the reference photodetector circuit and the plume photodetector circuit the evaluating means has a third input to enable the comparing means.

Preferably, the evaluating means comprises an AND gate, a flip-flop and a relay control output. The outputs from the reference photodetector circuit, plume photodetector circuit, and enable line are inputs to the AND gate. The output from the AND gate sets the flip-flop. The flip-flop causes relay contacts in the relay control to stop firing the laser.

The AND gate of the evaluating means has the effect of comparing the window pulse to the disabling pulse caused by the drilling plume. When the laser is removing metal and creating heated minute particles, the duration of the window and disabling pulses are dissimilar. The disabling pulse will contain the intrinsic laser radiation pulse radiation and the extrinsic radiation pulse from the hot minute particles. This causes the disabling pulse waveform to be much longer or wider than the window pulse from the reference photodetector circuit. Since the disabling pulse waveform is low when the window pulse is high, the output from the AND gate will remain low.

Consequently, no trip signal is activated to stop the firing of the laser. However, when only the intrinsic laser pulse radiation is detected by the plume photodetector, the disabling pulse from the plume photodetector circuit returns to a high state sometime before or during the period of the window pulse from the reference photodetector circuit. Thus the output from the logical AND gate generates a positive pulse to set the flip-flop high and close the relay contacts. A contact closure causes the machine control to stop firing the laser.

BRIEF DESCRIPTION OF THE DRAWINGS

The foregoing and other objects, features and advantages will become more apparent by reference to the following detailed description, taken in conjunction with the accompanying drawing in which:

FIGS. 3A-G show a series of waveforms for the respective components of FIG. 2, representative of the drilling plume comprising intrinsic and extrinsic radiation; and FIGS. 4A-G show a series of waveforms for the respective components of FIG. 2 representative of the drilling plume comprising intrinsic radiation.

DETAILED DESCRIPTION OF THE PREFERRED EMBODIMENT

Figure 1:
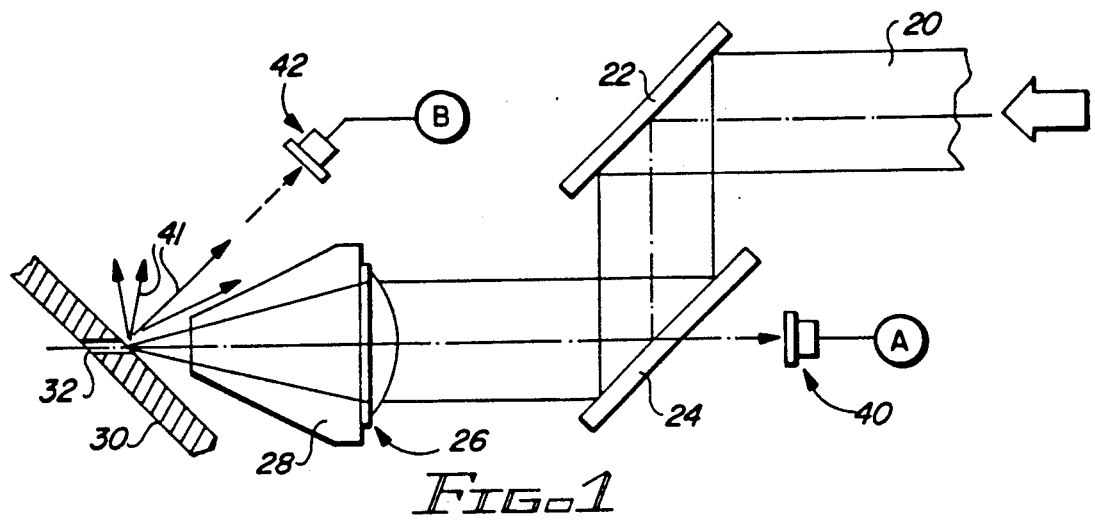
FIG. 1 illustrates a laser drilling process.

FIG. 1 illustrates a pulse laser drilling process. A drilling laser beam 20 comprising a plurality of laser pulses deflects off a first mirror 22 onto a dielectric coated mirror 24 which in turn deflects the laser beam 20 through a drilling lens 26. The drilling lens 26 concentrates the laser beam 20 through a protective shield 28 and onto a workpiece 30 to drill a hole 32.

A reference photodetector 40 is used to detect the laser pulses of the laser beam 20 and produces a signal representative thereof in a manner well known to those of ordinary skill in the art. The reference photodetector 40 can be situated in any manner as long as the reference photodetector 40 detects only the intrinsic radiation from the laser beam pulses and none of the extrinsic radiation caused by the heated metal particles. For example, the reference photodetector 40 could derive a reference signal from the laser flashlamps instead of the laser pulses themselves. Other various locations of the reference photodetector 40 are determined by the particular arrangement of the laser beam apparatus. In the preferred embodiment, the reference photodetector 40 looks toward the shield 28 through the dielectric coated mirror 24. Since the shield 28 limits the field of view of the reference detector 40, only the laser beam 20 is viewed at the shield 28 rather than the heated metal particles from the workpiece 30. Thus, a reference signal is produced by the reference photodetector 40 when a laser pulse is detected.

The plume signal photodetector 42 views the workpiece 30 at a point where a hole is being drilled. The light radiation detected by the signal photodetector 42 is produced by the drilling plume comprising intrinsic laser pulse radiation reflected from the surface of the workpiece and the extrinsic radiation from the heated metal particles.

The extrinsic radiation from the heated metal particles decays exponentially in time with a much longer decay time constant than the intrinsic laser pulse radiation. The combination of the intrinsic radiation and the extrinsic radiation causes the electrical signal from the signal photodetector 42 to have a different time and amplitude characteristic from the condition when the drilling plume is comprised only of intrinsic radiation.

When the laser has drilled through the workpiece only a portion of the intensity of the laser pulse radiation is reflected from the edges of the hole. The laser pulse radiation has a radial Gaussian distribution for intensity, with the center of the laser beam having the greatest intensity. The laser radiation reflected from the edges does not have enough power to cut through the workpiece, so that when a hole is drilled, a portion of the laser pulse radiation is still reflected from the edges of the holes. When the hole is through, the reflected radiation from the edges produces only intrinsic laser radiation detected by the plume photodetector 42. The difference in the plume comprised of intrinsic and extrinsic radiation and the plume comprised of intrinsic radiation controls the laser drilling operation.

For a better understanding of the functional cooperation of the components described above, attention is directed to FIGS. 3A-G and FIGS. 4A-G of the drawings wherein the waveforms from the respective components are illustrated in detail. These waveforms will be described subsequent to the description of FIG. 2.

Figure 2:
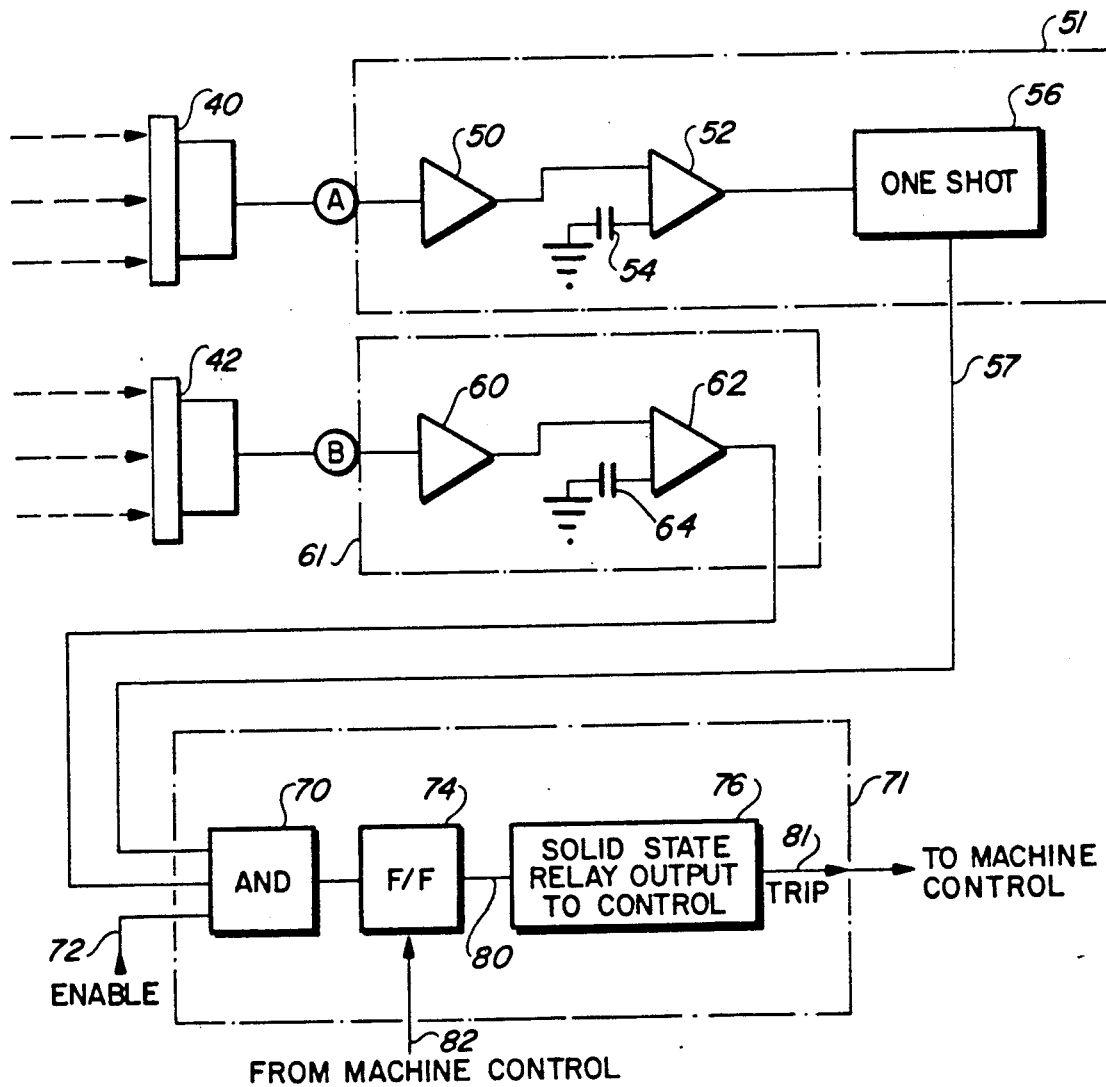
FIG. 2 illustrates a block diagram of a detector in accordance with the preferred embodiment.

Reference is made to FIG. 2 which illustrates a block diagram of the circuitry connected to photodetectors 40 and 42 for determining when a through bore is drilled. The reference photodetector circuit 51 comprises a limiting amplifier 50, a reference comparator 52 and a monostable multivibrator 56. The reference photodetector 40 converts a change in received radiation to an electric potential. The limiting amplifier 50 connected to the output of the reference photodetector 40 amplifies and limits the reference signal from the reference photodetector 40. The limiting amplifier 50 may use, for example, a diode limiting circuit in a feedback loop (not shown) to reduce the influence of the laser intensity on the reference signal. The reference signal from the limiting amplifier 50 is then fed to a non-inverting comparator 52 which converts the reference signal into a square wave. The reference signal from the limiting amplifier 50 must exceed a comparison voltage set by a voltage reference 54. Non-inverting comparator 52 acts as a filter by requiring the signal output of reference photodetector 40 to exceed the value of the reference voltage set by reference source 54 before changing its output state. Such a technique reduces the likelihood of noise generated signals and oscillations due to varying brightness levels and squares the pulse of the reference signal. The trailing edge of the reference signal from the non-inverting comparator 52 triggers a monostable multivibrator 56. The monostable multivibrator 56 produces a window pulse on line 57 which is one input into an evaluating means 71.

A plume photodetector circuit 61 comprising an operational amplifier 60 and an inverting comparator 62 is connected to the output of the plume photodetector 42. The operational amplifier 60 receives the signal from the plume photodetector 42. The amplifier 60 is designed to be driven into saturation by the intensity of the intrinsic radiation on the plume photodetector 42. Allowing the amplifier 60 to saturate removes the influence of a variable width, high brightness laser pulse, since the extrinsic signal caused by the heated particles is contained in the decaying tail of the plume photodetector 42 response. Because the extrinsic radiation persists for a significantly longer time than the intrinsic radiation, the pulse waveform from the amplifier 60 is much longer than the window pulse from the reference photodetector circuit 51. The waveform pulse from the amplifier 60 passes through an inverting comparator 62 to the evaluating means 71. The inverting comparator 62 inverts that portion of the signal from amplifier 60 which exceeds a comparison voltage set by a voltage reference 64. Inverting comparator 62 shapes the signal from the amplifier 60 into a square wave. The output from the inverting comparator 62 acts as a disabling signal to the evaluating means 71.

The synchronization signal in the form of a window pulse from the reference photodetector circuit 51 and the disabling pulse from the plume photodetector circuit 61 are inputs to evaluating means 71. The evaluating means 71 comprises an AND gate 70, a flip-flop 74, and a relay control 76. The outputs from the reference photodetector circuit 51 and the plume photodetector circuit 61 are inputs to the AND gate 70 of the evaluating means 71. Additionally, an ENABLE signal is supplied on line 72 to the AND gate 70.

If extrinsic and intrinsic radiation are detected by the plume photodetector 42 the disabling pulse from the plume photodetector circuit 61 is wider than the window pulse and occurs just before the window pulse from the reference photodetector circuit 51. Since the disabling pulse from the plume photodetector circuit 61 is low while the window pulse is high the AND gate 70 will remain low.

A flip-flop 74 is connected to the output of the AND gate 70. The output from the flip-flop 74 is fed to a solid state relay output control 76 which is well known to those of ordinary skill in the art. The relay output 76 controls the firing of the laser. If the relay contacts are open, the laser keeps firing and thus drilling continues. If the relay contacts are closed, the laser stops firing and the drilling ceases. In order to eliminate any timing problems with the machine control, a set condition is held on the flip-flop 74 until the machine control sends out a reset signal on line 82 to the flip-flop. If the flip-flop has been set, a relay signal is generated on output line 80. The input to the solid state relay control 76 is the relay line 80. A relay signal causes the solid state relay 76 to set a trip signal 81 which stops the firing of the laser. Since the output from the AND gate 70 will remain low when extrinsic and intrinsic radiation are detected by the plume photoconductor 42, the laser continues to fire.

If only intrinsic radiation is detected by the plume photoconductor 42, the disabling pulse from the plume photodetector circuit 61 still occurs before the window pulse from the reference photodetector circuit 51. However, the disabling pulse from the plume photodetector circuit 61 will return to the high state sometime before or during the period the window pulse is high. In this instance, the AND gate 70 will have a high input combined on all three inputs and will cause a set signal to be sent to the flip-flop 74. The flip-flop 74 is set, and a relay signal 80 is sent to the solid state relay output control 76 to cause the machine control to stop the firing of the laser. Referring to FIGS. 3A-G and FIGS. 4A-G, there is shown a comparison of the waveforms from the respective components which will best illustrate the operation of the present invention. FIGS. 3A-G represent the signals present when the plume photodetector senses intrinsic and extrinsic radiation from the drilling plume. It is important to note that the intrinsic radiation is caused by the reflected laser radiation from the workpiece and the extrinsic radiation is caused by the hot minute burning particles. FIGS. 4A-G represent the signals present when the plume photodetector senses only intrinsic radiation. In this circumstance, the laser has completed drilling a hole through the workpiece and no extrinsic radiation will be present.

For FIGS. 3A and 4A the waveform illustrates the laser pulse of the laser beam 20. The FIG. 3B and FIG. 4B correspond to the reference signal detected by the reference photoconductor 40. The flat top of the waveform is determined by the limiting action of the limiting amplifier 50. The pulse is squared up by applying it and a reference level to the non-inverting comparator 52. This is shown as waveform in FIG. 3C and FIG. 4C. The trailing edge of the pulse from the comparator 52 triggers the monostable multivibrator 56 and produces the waveform of FIG. 3D and FIG. 4D. The pulse for the monostable multivibrator 56 provides a timing or window pulse which determines whether the laser is to continue drilling or is to stop.

The signal from the plume photodetector 42 amplified through amplifier 60 is shown as the waveform in FIG. 3E and FIG. 4E. The waveform for FIG. 3E includes the intrinsic light from the reflected laser pulse radiation plus the extrinsic radiation from the heated particles. The waveform for FIG. 4E is the reflected intrinsic pulse laser radiation only. Note that the waveform for FIG. 3E is much wider than the waveform for FIG. 4E. It is important to note that the intrinsic pulse laser radiation of FIG. 4E is very much narrower than the combined intrinsic and extrinsic radiation of FIG. 3E. The signal from the amplifier 60 as shown in the waveform FIGS. 3E and 4E is fed to the inverting comparator 62. The output from the inverting comparator 62 is shown as the waveforms in FIG. 3F and FIG. 4F, this is the disabling pulse. The inverting comparator squares up and inverts these waveforms. Note that the width of the pulse of FIG. 3F is very much wider than the width of the pulse for the waveform FIG. 4F.

The inputs to the AND gate 70 are waveforms from FIG. 3D and FIG. 3F for intrinsic and extrinsic radiation, and the waveforms FIG. 4D and FIG. 4F for intrinsic radiation plus an enable signal which for this example is high. In FIG. 3D and FIG. 3F, the disabling of FIG. 3F is always low when the window pulse is high. Thus, the output from the AND gate 70 is always low. This in turn causes the output from the control relay 76 to be low which is shown in FIG. 3G. Referring to FIG. 4F, the disabling pulse will be low when the window pulse of FIG. 4D is high; but there is also a point (A) at which the window pulse is high when the disabling pulse is high. Thus, the output from the AND gate will be high which will trip the control relay to shut off the laser drilling.

Another embodiment of the present invention, is to situate the signal photoconductor 42 at the exit or back of the workpiece and to configure 62 as a non-inverting comparator. With the sensor in the back or looking at the exit region rather than the entrance, the signal photoconductor 42 would remain dark until a breakthrough occured. The presence of any intrinsic or extrinsic radiation would signal a breakthrough. This in turn commands the laser to stop drilling. This implementation, however, requires that the exit region be visible either directly or through a light pipe or fiber optics run from the exit region to the signal photoconductor 42.

Thus, as has been shown laser drilling is stopped con-currently with completion of a through hole. The present invention discriminates between intrinsic radiation and extrinsic radiation to determine when the laser should stop firing. The present invention overcomes the previous problems of overdrilling and underdrilling with laser drilling, and as is apparent to one of ordinary skill in the art, provides an apparatus and method to detect when a through bore is drilled in a workpiece.

While the principles of the invention have now been made clear in an illustrative embodiment, there will become obvious to those skilled in the art many modifications in structure, arrangement, and components used in the practice of the invention and otherwise which are particularly adapted for specific operating requirements without departing from those principles. The appended claims are therefore intended to cover and embrace any such modifications, within the limits only of the true spirit and scope of the invention.

What is desired to be secured by Letters Patent is the invention as defined in the following claims:

1. In a pulse laser drilling process having a machine control for controlling a laser, an apparatus to detect when a hole is drilled through a workpiece comprising:
   (a) first monitoring means for detecting a laser pulse and producing an output signal representative thereof;
   (b) second monitoring means for detecting reflected radiation from an entrance of the hole being drilled and producing an output signal representative thereof; and
   (c) evaluating means having a first input for receiving the output signal from said first monitoring means and a second input for receiving the output signal from said second monitoring means, said evaluating means effective for (1) comparing said output signals from said first and second monitoring means and effective for (2) producing an output signal indicative of when a through hole is completed for indicating to the machine control to stop any further laser pulse.

2. The apparatus of claim 1, wherein said evaluating means comprise:
   (a) first comparing means having a first input for receiving the output signal from said first monitoring means and a second input for receiving a first reference signal, said first comparing means producing an output signal when an output signal from said first monitoring means exceeds the first reference signal;
   (b) pulsing means having an input for receiving the output signal from said first comparing means, said pulsing means producing an enabling output signal representative of a pulse having a predetermined interval when an output signal is produced by said first comparing means;
   (c) second comparing means having a first input for receiving the output signal from said second monitoring means and a second input for receiving a second reference signal, said second comparing means producing a disabling output signal representative of a pulse when an output signal from said second monitoring means exceeds the second reference signal; and
   (d) gating means having a first input for receiving the enabling signal and a second input for receiving the disabling signal, said gating means generating a gating pulse when the disabling signal terminates before the enabling signal.

3. The apparatus of claim 2, wherein the output pulse from said pulsing means is triggered by a signal representative of a trailing edge of the output signal from said first comparing means.

4. The apparatus of claim 2, wherein the disabling signal terminates before the enabling signal only when a through hole is drilled through the workpiece.

5. The apparatus of claim 2, wherein said first comparing means comprises a non-inverting type comparator.

6. The apparatus of claim 2, wherein said second comparing means comprises an inverting type comparator.

7. The apparatus of claim 2 wherein said pulsing means comprises a monostable multivibrator.

8. The apparatus of claim 2, wherein said gating means comprises an AND gate.

9. The apparatus of claim 1, wherein said first monitoring means comprise:
   (a) a first photodetector which detects the laser pulse and produces an electric potential; and
   (b) limiting means for clipping the electric potential from said first photodetector.

10. The apparatus of claim 1, wherein said second monitoring means comprise:
    (a) a photodetector which detects reflected radiation from the workpiece and produces an electric potential; and
    (b) limiting means for clipping the electric potential from said second photodetector.

11. An apparatus for detecting when a hole is drilled through a workpiece by way of a pulse laser drilling process having a machine control for controlling whether the pulse laser drill emits laser pulses comprising:
    (a) first monitoring means which detects the laser pulse and produces an output signal representative thereof;
    (b) first limiting means for clipping the output signal from said first monitoring means;
    (c) first comparing means having a first input for receiving the clipped output signal from said first monitoring means and a second input for receiving a first reference signal, said first comparing means producing an output signal when an output signal from said first monitoring means exceeds the first reference signal;
    (d) pulsing means having an input, said pulsing means receiving the output signal from said first comparing means for producing an enabling output signal representative of a pulse having a predetermined interval when an output signal is produced by said first comparing means;
    (e) second monitoring means which detects reflected radiation from the entrance of the hole being drilled and produces an output signal representative thereof;
    (f) second limiting means for clipping the output signal from said second monitoring means;
    (g) second comparing means having a first input for receiving the clipped output signal from said second monitoring means and a second input for receiving a second reference signal, said second comparing means producing a disabling output signal representative of a pulse when the clipped output signal from said second monitoring means exceeds the second reference signal; and (h) gating means having a first input for receiving the enabling signal and a second input for receiving the disabling signal, said gating means generating a gating pulse indicative of when a hole is drilled for indicating to the machine control to stop any further laser pulse when the disabling signal terminates before the enabling signal.

12. The apparatus of claim 11, wherein said first and second monitoring means respectively comprise first and second photodetectors.

13. The apparatus of claim 12, wherein said first comparing means comprises a non-inverting type comparator.

14. The apparatus of claim 13, wherein said second comparing means comprise an inverting type comparator.

15. The apparatus of claim 14, wherein said pulsing means comprise a monostable multivibrator.

16. The apparatus of claim 15, wherein said gating means comprise an AND gate.

17. A method for detecting when a hole has been drilled through a workpiece by way of a pulse laser drilling process having a machine control for controlling whether the pulse laser drill emits laser pulses comprising the steps of:

(a) detecting the laser pulse and producing an output signal representative thereof;

(b) clipping the output signal representative of the laser pulse;

(c) comparing the clipped output signal representative of the laser pulse to a first reference signal in order to produce a compared output signal when the clipped output signal is greater than the first reference signal;

(d) triggering, with the compared output signal, an enabling output signal representative of a pulse having a predetermined interval;

(e) detecting reflected radiation from the entrance of the hole being drilled to produce an output signal representative thereof;

(f) clipping the output signal representative of the reflected radiation;

(g) comparing the clipped output signal representative of the reflected radiation to a second reference signal in order to produce a disabling output signal representative of a pulse when the clipped output signal representative of the reflected radiation is greater than the second reference signal; and (h) generating a gating pulse indicative of when a hole is drilled to the machine control in order to stop any further laser pulse when the disabling signal terminates before the enabling signal.

* * * * *